United States Patent [19]

McMurtry

[11] 4,155,171
[45] May 22, 1979

[54] CONTACT-SENSING PROBE

[75] Inventor: David R. McMurtry, Gloucestershire, England

[73] Assignees: Rolls-Royce Limited; Renishaw Electrical Limited, both of England

[21] Appl. No.: 834,554

[22] Filed: Sep. 19, 1977

[30] Foreign Application Priority Data

Sep. 30, 1976 [GB] United Kingdom ............... 40532/76

[51] Int. Cl.² .............................................. G01B 7/02
[52] U.S. Cl. .................................................. 33/174 L
[58] Field of Search ................ 33/23 H, 23 K, 169 R, 33/169 C, 172 R, 172 D, 172 E, 172 B, 174 R, 174 L, 174 P, 174 PC; 90/62 R; 82/14 B

[56] References Cited

U.S. PATENT DOCUMENTS

| 3,122,970 | 3/1964 | Rhoades | 33/23 K |
|---|---|---|---|
| 3,250,012 | 5/1966 | Hilton et al. | 33/172 E |
| 3,362,076 | 1/1968 | Bailey | 33/169 C |
| 3,766,653 | 10/1973 | McKay, Sr. | 33/174 L |

FOREIGN PATENT DOCUMENTS

| 1184972 | 1/1965 | Fed. Rep. of Germany | 33/172 B |
|---|---|---|---|
| 1445977 | 8/1976 | United Kingdom | 33/174 L |

OTHER PUBLICATIONS

Savage, "Multi-directional Probe," Apr. 1967, pp. 7 & 8.

*Primary Examiner*—Richard R. Stearns
*Attorney, Agent, or Firm*—Stevens, Davis, Miller & Mosher

[57] ABSTRACT

In a contact-sensing probe having a stylus holder supported for tilting about support surfaces at any one of three locations, additional support surfaces are provided in positions between the three locations to increase the number of locations about which the holder is tiltable.

3 Claims, 7 Drawing Figures

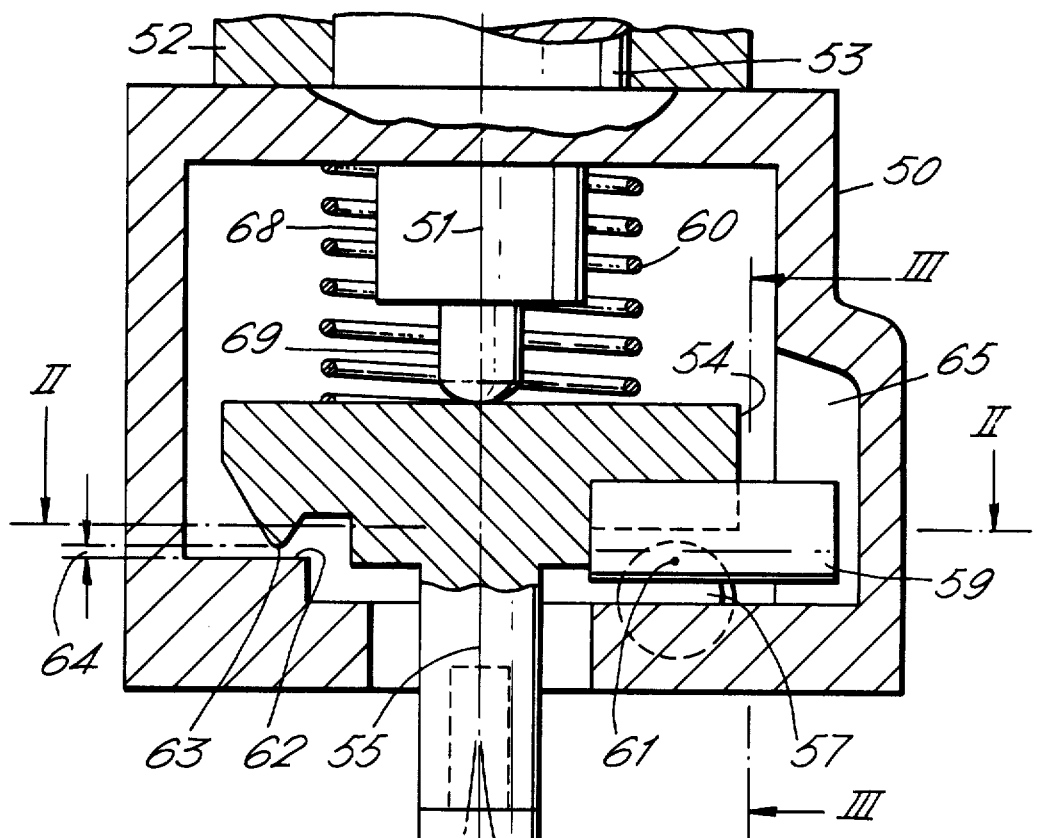
Fig.1.
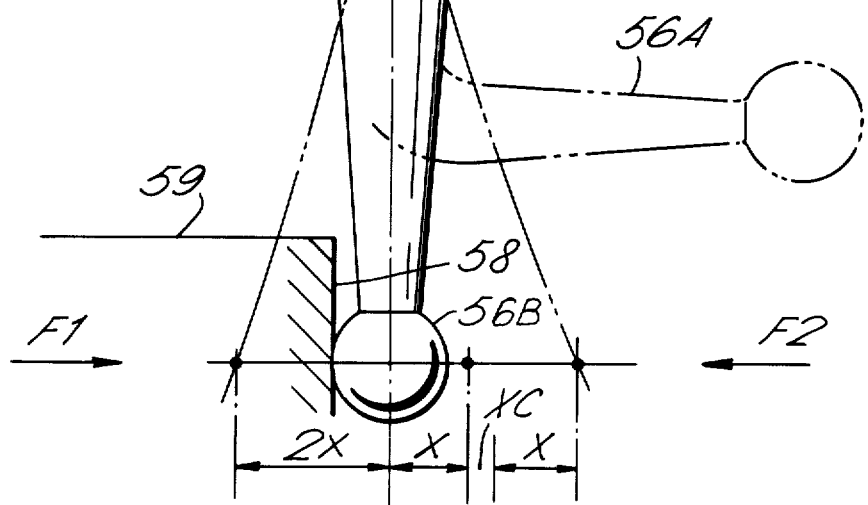

CONTACT-SENSING PROBE

This invention relates to contact-sensing probes for use in measuring apparatus.

It is known for such a probe to comprise a first member or stylus holder, a second member or body, three locating elements provided in spaced apart relationship on one of the members and each disposed between a respective pair of mutually convergent surfaces provided on the other member, a bias means arranged to act on the movable member and to co-operate with the convergent surfaces to move the movable member toward a rest position in which each element engages both surfaces of the respective said pair, and means for sensing a displacement of the movable member from the rest position.

The arrangement of said three locations has the advantage of providing complete stability of support.

In use the probe is installed in a co-ordinate measuring machine and the machine is operated to move the probe toward a workpiece to be measured. When the free end or tip of the stylus contacts the workpiece the sensing means output a step signal indicating that contact is made. However, the signal does not occur immediately on said contact. The probe body continues to move by a minute amount relative to the tip of the stylus before the sensing means responds. This is explained by the fact that the stylus bends under the operating force necessary to overcome the resistance of the bias means. Such bending is taken into account in the measuring process, i.e. the amount of relative movement between the probe body and the stylus tip (referred to as the "bending allowance") is deducted from the distance measured by the machine.

A difficulty arises in the known probe because the operating force is not the same for different directions of application of that force, and it is not practical to use different bending allowances for different such directions. Therefore, the probe is not accurate to the extent of the maximum difference that may occur between the operating forces. For example, assuming the direction of contact is at right angles to the probe axis, the operating force tends to tilt the stylus about either one or two of the locations depending on the direction of the force and, having regard to the geometry of the arrangement, the force necessary to tilt the member about two locations is only half of that required to tilt about one location.

It is one of the objects of this invention to overcome the above difficulty.

According to this invention there is provided a contact-sensing probe comprising a first member or stylus holder supported on a second member or probe body at three spaced apart locations, at each said location one of the members being provided with a locating element disposed between a respective pair of mutually convergent surfaces provided on the other member, a bias means arranged to act on the first member and to co-operate with the convergent surfaces to move the first member toward a rest position in which each element engages both surfaces of the respective said pair, the first member being displaceable from the rest position in opposition to the bias means by being tilted about any one of said locations, and means for sensing a displacement of the first member from the rest position, characterized in that the one member has provided thereon additional support surfaces engageable with additional support surfaces provided on the other member in positions spaced from said locations thereby to increase the number of locations about which the first member is tiltable, the additional support surfaces on the respective first and second members being spaced apart by a clearance lying between zero and a specified limit.

In the probe according to the invention the smaller operating force is more nearly the same as the larger such force. The greater the number of said support surfaces the less will be the difference between the high and the low operating force, and consequently the greater will be the accuracy of the probe for a given bending allowance.

In so far as there is a practical difficulty in ensuring that each element engages both said convergent surfaces and said additional surfaces, the invention provides for said clearance between zero and a specified limit. The limit should be such that the derogation of accuracy introduced by the clearance is less than the improvement of accuracy introduced by the increase in the number of locations to a number greater than three. In this way there is a net gain in accuracy even though there is said clearance. However, as will be shown, it is possible to reduce said clearance to zero, i.e. it is possible to achieve what is for practical purposes a simultaneous contact between all locating elements and their respective pairs of convergent surfaces as well as between the additional surfaces of the respective members.

Examples of probes according to this invention will now be described with reference to the accompanying drawings wherein:

FIG. 1 is a sectional elevation of a probe according to a first example.

Figure 2:
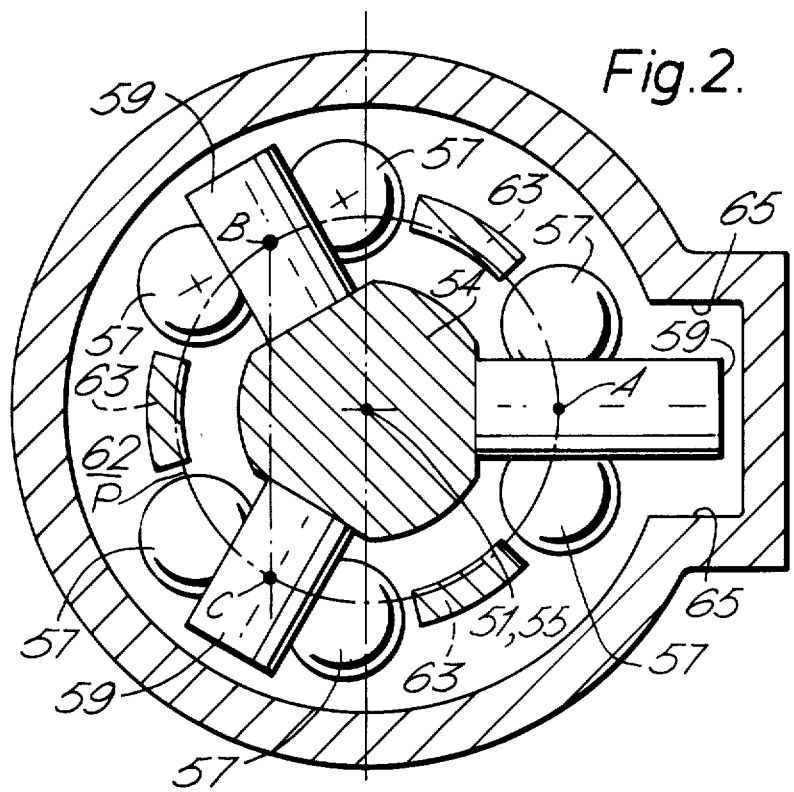
FIG. 2 is a section on the ine II—II in FIG. 1.
Figure 3:
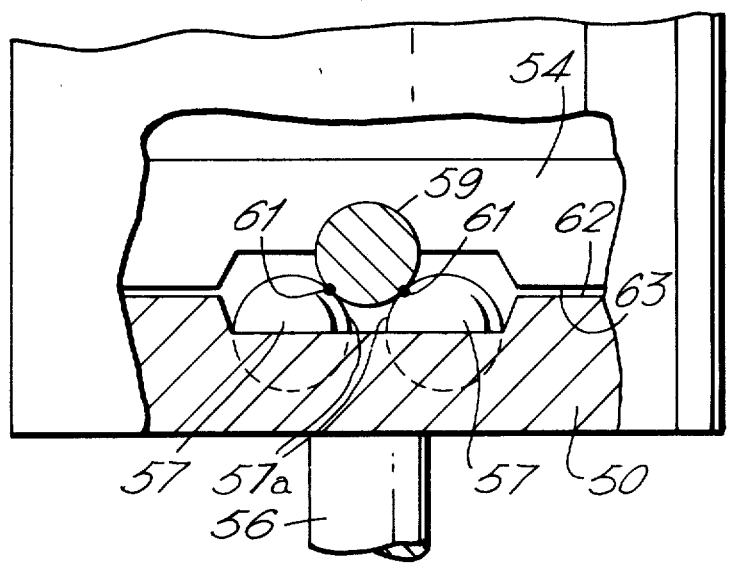
FIG. 3 is a section on the line III—III in FIG. 1.

Referring to FIGS. 1 to 3 there is shown a probe comprising a body 50 having an axis 51 and being connectable to an input member 52 of a measuring machine by a spigot 53. The body 50 supports a stylus holder 54 having an axis 55. A stylus 56B secured to the holder has at its free end a spherical tip 57 whereby to contact a surface 58 of a workpiece 59. In the illustrated position of the holder 54, being its rest position, the axis 51,55 coincide. The holder is supported on the body at three locations A,B,C defined by points arranged on a common pitch circle P about the body axis 51.

More specifically, at each location A,B or C there are provided a pair of support elements being hardened and polished steel balls 57 secured to the body in positions spaced apart tangentially in respect of the pitch circle P. Each pair of balls 57 define a pair of mutually convergent surfaces 57a. Further, at each location A,B or C, the holder 54 has secured thereto a locating element being a hardened and polished steel cylinder 59 extending radially from the axis 55.

Each cylinder 59 is situated adjacent one of the pairs of balls 57 and can slide on the balls into engagement with both the convergent surfaces 57a to become located therebetween. By virtue of the mutually convex relationship between each cylinder 59 and the adjacent balls 57 the holder 54 can slide into position, being said rest position, in which each cylinder 59 engages both convergent surfaces 57 of the adjacent two balls at two points 61. A spring 60 arranged between the body 50 and the holder 54 urges the holder into the rest position. The cylinders 59 and convergent surfaces 57a provide a positive support for the holder against tilting about the locations A,B,C and against movement transverse to or about the axis 51.

The body 50 has formed thereon or otherwise secured thereto additional support surfaces being three flat surfaces 62 extending between the locations A,B,C at a level intersecting the points 61. The holder 54 has formed thereon or otherwise secured thereto additional support surfaces being three arcuate edge-like surfaces 63 extending concentricially with the axis 51 and between the cylinders on a diameter about equal to that of the pitch circle P. The surfaces have a small clearance 64 therebetween to ensure that the rest position of the holder 54 is still positively determined by the balls 57.

The holder 54 can be displaced from the rest position by a force F1 acting on the stylus in the sense causing tilting of the holder about the axis BC after deflection of the tip 56B by a distance X. A force F2 in the opposite direction causes tilting about the location A whose distance from the axis 51 is twice that of the axis BC so that the deflection is 2X. If, after occurance of the deflection X due to the force F1 the stylus movement is continued, the surface 63 will begin to approach the surface 62 until the clearance 64 is taken up. Thereafter the force F1 will rise to become equal to the force F2 and the deflection become equal to 2X. However, due to the clearance 64 the total movement of the tip 56B of the stylus will be 2X+XC where XC is movement due to the clearance. The accuracy tolerance of the probe is then equal to XC as against the previous tolerance of X. So long as the clearance is so small that XC<X the accuracy tolerance of the probe is improved by the presence of the surfaces 62,63.

Figure 4:
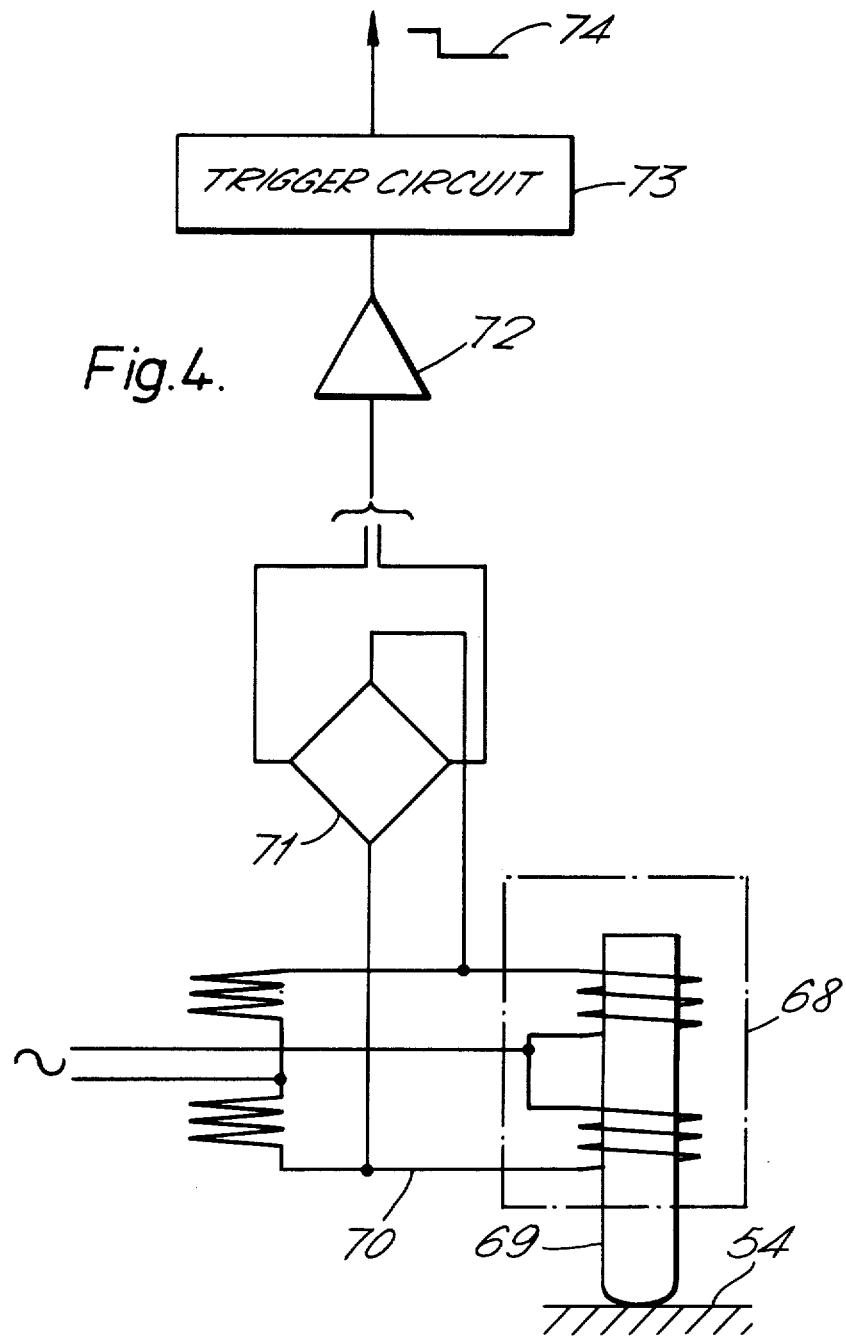
FIG. 4 is a ciruit diagram pertaining to FIG. 1.

Any said displacement beyond said deflection of the stylus, i.e. any tilting of the holder 54, is sensed by constituting the balls 57 terminals of a circuit (not shown), the terminals being bridged by the cylinders 59 in a manner known per se. Alternatively, the displacement may be sensed by a transducer 68 (FIGS. 1 and 4) having a movable core 69 bearing lightly on the center of the holder 54. The transducer is connected through an induction bridge 70, rectifier 71, amplifier 72, and trigger circuit 73 to produce a step signal 74 when the tilting exceeds a predetermined limit.

In addition to being displaced by tilting, the stylus 56 may also be displaced by being moved linearly upwards in the direction of the axis 51 or angularly about the axis 51. For the latter displacement, the stylus has to have a lateral extension 56A. Surfaces 65 may be provided on the body 50 adjacent the cylinders 59 to prevent displacement of the stylus to an extent preventing the cylinders from becoming re-seated on their respective pairs of balls 57.

Figure 5:
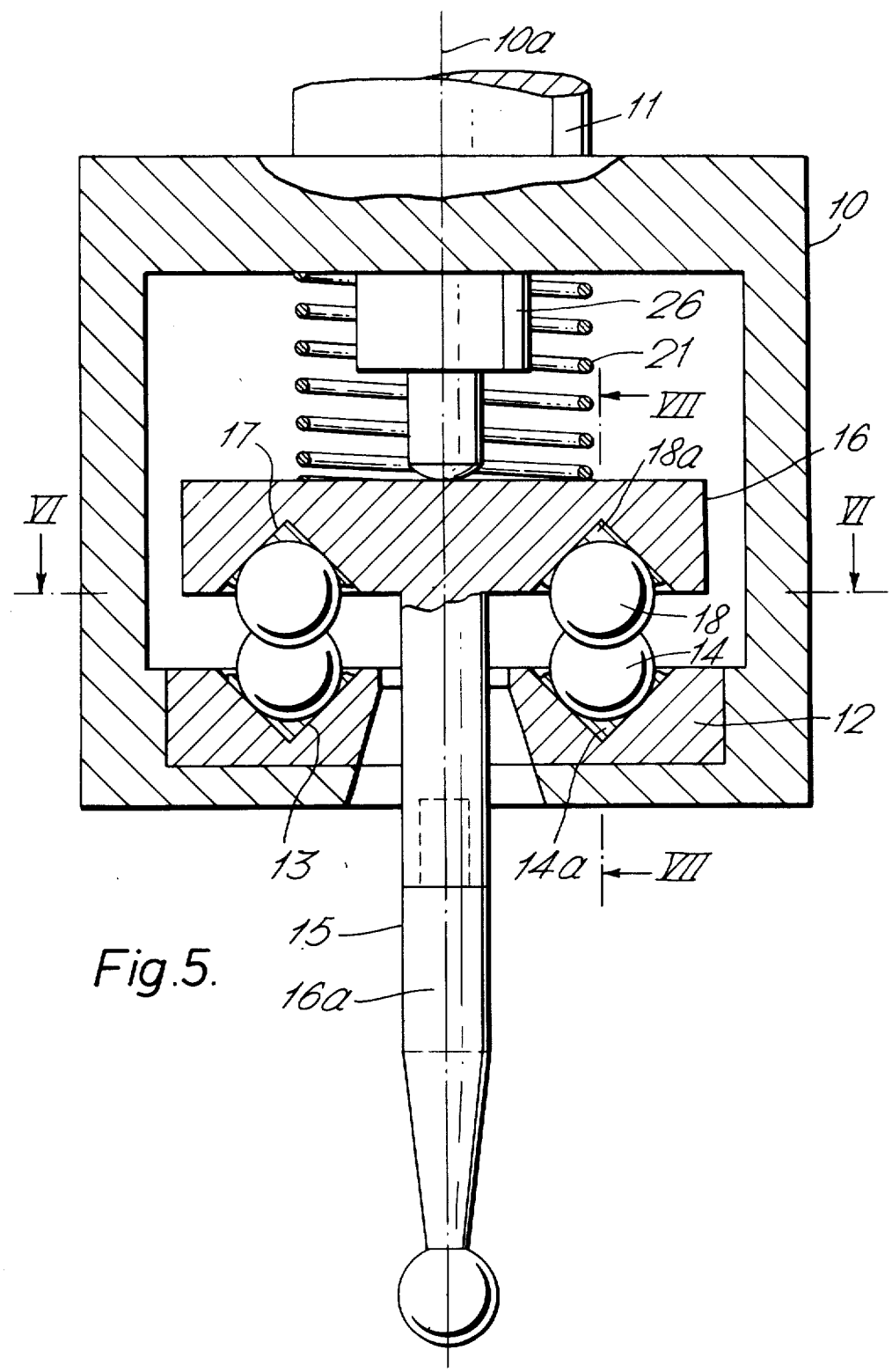
FIG. 5 is a sectional elevation of a probe according to a second example.
Figure 6:
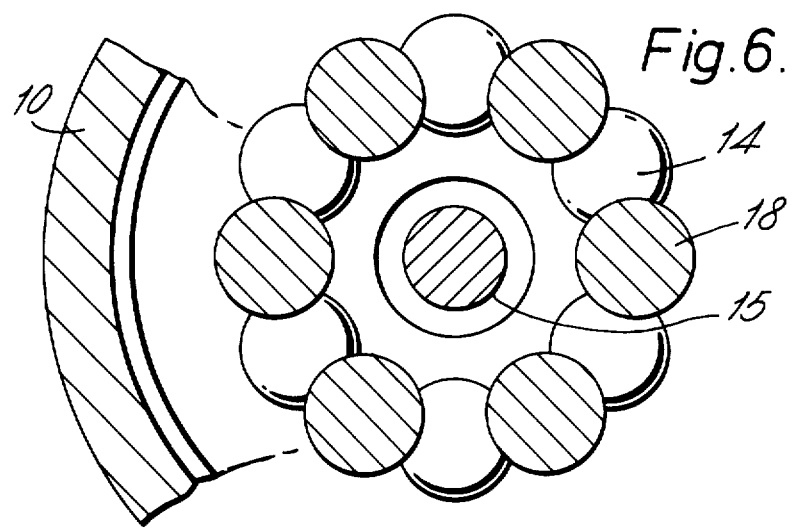
FIG. 6 is a section on the line VI—VI in FIG. 5.
Figure 7:
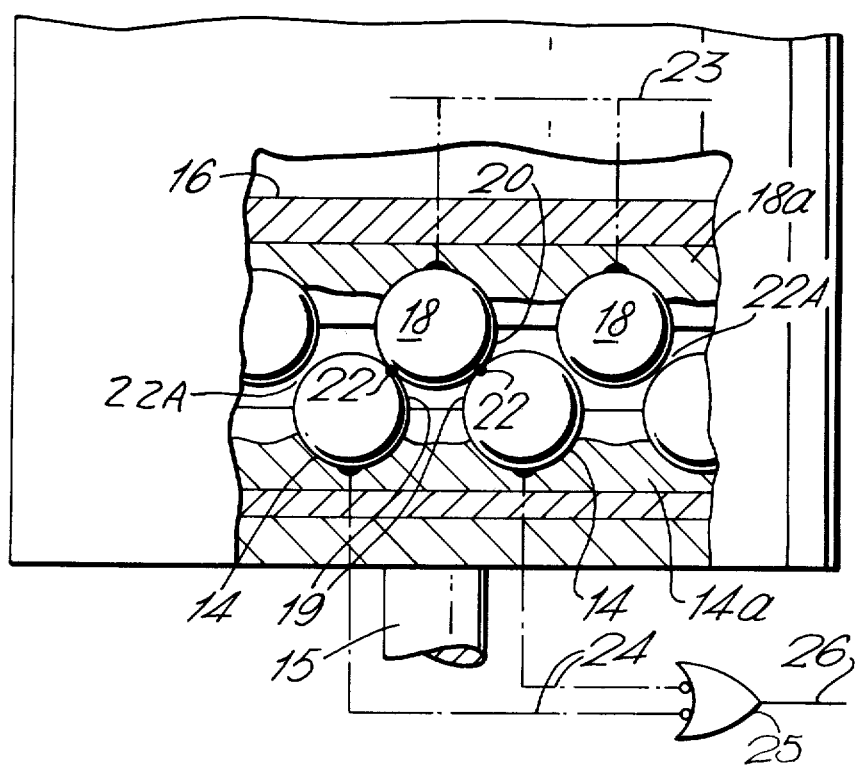
FIG. 7 is a section on the line VII—VII in FIG. 5.

In the probe shown in FIGS. 5 to 7 a body 10, having an axis 10a, comprises a ring 12 having an upwardly open groove 13 of "V" cross-section and concentric with the axis 10a. The groove contains an annular array of hardened and polished steel balls 14. A stylus holder or plate 16, having an axis 16a, has secured thereto a stylus 15. The holder 16 further has a downwardly open groove 17 of "V" cross-section facing the groove 13, and containing an annular array of hardened and polished steel balls 18. Any one ball 18 is engageable between two adjacent balls 14. Any pair of adjacent balls 14 form between them two mutually convergent surfaces 19 (FIG. 7). Any one ball 18 defines a surface 20 whereby to contact the two surfaces 19 of the adjacent balls 14. A spring 21 urges the plate 16 toward the ring 12, and the balls 14, 18 make contact at points 22 on the surfaces 19,20 under the bias exerted by the spring 21.

To ensure that contact is made between each ball 18 and the adjacent two balls 14 the balls are initially free to roll in the respective grooves 13,17 and the balls settle to a position in which all balls 14 contact all balls 18 by rolling under the combined influence of the spring and the convergence of the surfaces 19. The surfaces 20 of two adjacent balls 18 are of course convergent in the same way as the surfaces 19 of two adjacent balls 14 and both sets of balls 14,18 behave in the same way as far as the accommodation around the grooves is concerned. To ensure satisfactory and rapid seating of the balls, a relatively strong version of the spring 21 may be used and the probe may be vibrated, the stylus 15 being held by a jig in alignment with the axis 10a.

The balls 14,18 are allowed to settle as described while an epoxy resin 14a, 18a applied previously in the grooves is still soft, and the adhesive is allowed to harden without disturbing the relative position of the members 10,15.

When all the balls 14,18 make contact as described, the holder 16 has a positively defined rest position on the member 10. In operation, when a force is applied to the stylus, as by contact thereof with a workpiece, the stylus 15 is displaced from the rest position i.e. the plate 16 will rise or be tilted. When the force on the stylus ceases, the co-operation of the spring and said convergent surfaces causes the balls to slide on one another until they make contact again at the points 22 and the positive rest position is once more established.

Uniform engagement between the balls 14,18 may be improved by vibrating the holder while a fine polishing abrasive is introduced between the balls.

The minimum number of balls in each set is four but a preferred minimum is six as illustrated so that there are six distinct locations for seating the holder on the body. If it is desired to ensure positive seating at three of the locations every other one of the balls 18 may be individually polished, after the resin has hardened, to ease its contact pressure with the adjacent two balls 14 or even to produce a small clearance 22A. Thus there are three locations at which the support of the holder 16 is by surfaces additional to those at which positive location occurs, and the considerations as to accuracy of the probe described with reference to FIGS. 1 to 3 apply also in the probe shown in FIGS. 5 to 7.

The displacement of the holder 16 may be sensed by arranging for the balls 14,18 to be electric contacts. When that is done the holder 16 and disc 12 are made of a hard plastics material to ensure insulation while allowing said peripheral rolling during accommodation in the grooves 13,17. Preferably the balls of one set, say the balls 18, are connected to a common conductor 23 while the balls 14 of the other set are connected by individual conductors 24 to a NOR gate 25 so that a common output 26 is disestablished when contact at any one of the points 22 is broken. In so far as only three balls 18 are used for positive seating the electrical arrangement is limited to these three balls and their respective pairs of balls 14.

Any number of balls 14,18 may be used and beyond a certain number there is no significant improvement in the accuracy tolerance of the probe. A useful number has been found to be 15 balls per se and good results have been obtained with that number without the need for individual polishing of balls as mentioned above. The balls may be relatively small, say 1 to 2 mm in diameter, and the arrangement of balls 14,18 in grooves 13,17 lends itself to the economical manufacture of probes of very small overall body diameter, say 15 mm and below. Where a large number of small balls are used it is preferred to sense holder displacement by a transducer similar to that shown in FIGS. 1 and 4.

In a modification, not illustrated, one set of balls is replaced by tapered rollers.

In another modification, not illustrated, the plate 16 is made of lesser diameter than that illustrated and the balls 18 are replaced by radial arms of circular cross-section emanating from the plate and engaging between the balls 14.

In a further modification, not illustrated, one set of the balls, say the balls 14, instead of being seated in a groove, are seated in blind holes in the body 50, the depth of the holes being accurately determined to ensure the clearance 22A if desired.

I claim:

1. A contact-sensing probe comprising a first member defining a stylus holder supported on a second member at three spaced apart locations arranged symmetrically about an axis, at each said location one of the members being provided with a locating element disposed between a respective pair of mutually convergent surfaces provided on the other member, a bias means arranged to act on the first member and to co-operate with the convergent surfaces to move the first member toward a rest position in which each element engages both surfaces of the respective said pair, the first member being displaceable from the rest position in opposition to the bias means by being tilted about any one of said locations, and means for sensing a displacement of the first member from the rest position, wherein the improvement resides in that one of said members has provided thereon flat surfaces situated approximately at the level of said locations, the other member has provided thereon edge surfaces situated between said locations and being curved about said axis, said flat surfaces and edge surfaces confronting one another and co-operating to provide support for said first member at positions angularly between said locations when said first member is tilted away from said rest position.

2. A contact sensing probe comprising
a first member,
an annular array of at least four equispaced first balls connected to the said first member,
a second member,
an annular array of equispaced second balls of the same number as said first balls and connected to said second member, any pair of adjacent balls of a said array defining two convergent surfaces, any one ball of one of said members being disposed between the convergent surfaces defined by two adjacent balls of the other member,
bias means arranged to act on one of the members and to cooperate with the said convergent surfaces to move said one member toward a rest position in which at least three balls of one of said members engage the convergent surfaces defined by three pairs of balls of the other member, the one member being displaceable from the rest position in opposition to the bias means by being tilted relative to the other member, and
means for sensing a displacement of the one member from the rest position.

3. A probe according to claim 2 wherein an annular groove is provided in said first member for containing said first balls and a further annular groove is provided in said second member for containing said second balls, each said groove having convergent sides cooperating to support the balls between them, and a filling of synthetic resin securing the balls in position in said grooves.

* * * * *